United States Patent Office

2,913,508
Patented Nov. 17, 1959

2,913,508

PROCESS FOR ISOMERIZING HYDROCARBONS

Charles S. Wright, Crystal Lake, Ill., assignor to The Pure Oil Company, Chicago, Ill., a corporation of Ohio No Drawing. Application November 7, 1957
Serial No. 694,907

8 Claims. (Cl. 260—683.65)

This invention relates to the isomerization of isomerizable saturated hydrocarbons having 4–8 carbon atoms per molecule. It is more specifically concerned with upgrading the octane number of low-octane-number, low-boiling napthas boiling within the gasoline range, consisting predominantly of mixtures of saturated $C_4$–$C_8$ hydrocarbons by hydroisomerization in the presence of a composited catalyst consisting of a refractory, acidic, mixed oxides base having incorporated therein small amounts of a hydrogenation promoter.

In the catalytic hydroisomerization of feed stocks consisting predominantly of saturated $C_4$–$C_8$ hydrocarbons, in the presence of a catalyst comprising a refractory, acidic, mixed oxides base having incorporated therein small amounts of a hydrogenation promoter, according to this invention hydrocracking is mitigated and the yield of branched-chain, saturated hydrocarbons improved by carrying out the hydroisomerization in the presence of small amounts of organic carboxylic acids having a molecular weight within the range of about 150–400.

Because of the need for upgrading low-boiling napthas consisting predominantly of saturated hydrocarbons boiling in the gasoline range, in order to produce high-octane-number blending stocks for use in the formulation of gasoline motor fuels for use in the operation of high-speed, high-output, spark-ignited, internal combustion engines, isomerization has become an important unit process for use in integrated petroleum refining operations. The isomerization reaction is a reversible reaction limited by thermodynamic equilibria and does not take place at an economically useful rate without employing a suitable catalyst. Catalysts of the Friedel-Crafts type were used in initial development work in the catalytic isomerization of saturated hydrocarbons. Although catalysts of this type are effective for promoting the isomerization reaction, they present handling problems due to their corrosiveness, which are obviated by the use of solid-type catalysts. It has been found that solid catalysts prepared by incorporating a small amount of a hydrogenation promoter in a refractory, mixed oxides base, composited to evince hydrocarbon cracking activity and acidic properties, are active and selective for producing branched-chain, saturated hydrocarbons from feed stocks consisting predominantly of saturated hydrocarbons having 4–8 carbon atoms per molecule. In carrying out the isomerization, however, at optimum isomerization conditions of temperature and pressure for selected constituents of the isomerizable feed stocks, these catalysts manifest a hydrocracking tendency which, if uncontrolled, results in poor yields of desired products and rapid deterioration in catalytic activity. In extreme instances, hydrocracking can cause inoperability in commercial applications because of the exothermic nature of the hydrocracking reaction which gives rise to a problem of overheating in the reactor with sintering of the catalyst. Although hydrogen is employed in carrying out the hydroisomerization of isomerizable feed stocks employing the aforementioned solid catalysts, this expedient does not sufficiently reduce the extent of the hydrocracking side reaction to ameliorate the problem.

It is, therefore, the primary object of this invention to improve the efficiency of the hydroisomerization of isomerizable saturated hydrocarbons having 4–8 carbon atoms per molecule, in the presence of composite isomerization catalysts consisting of a refractory mixed oxides base, having incorporated therein small amounts of a hydrogenation agent, by suppressing exothermic side reactions, i.e., hydrocracking. It is another object of this invention to suppress the hydrocracking of feed stock constituents in the hydroisomerization of low-boiling napthas, consisting predominantly of saturated hydrocarbons boiling within the gasoline range, in the presence of catalysts consisting of a refractory mixed oxides base and a hydrogenation agent, to provide an isomerization effluent having a high octane number. These and other objects will become apparent from the following detailed description of this invention.

Because hydrocarbon decomposition is a concomitant, disadvantageous side-reaction in isomerization processes, considerable effort has been directed to developing various methods for overcoming this problem. It has been reported in Friedel-Crafts-catalyzed isomerization processes that cracking can be suppressed to some extent by carrying out the process in the presence of a variety of aliphatic, alicyclic, or aromatic hydrocarbons. Other expedients which have been employed include the introduction into the reaction zone of other types of hydrocarbon cracking suppressors such as, for example, metals capable of inhibiting cracking under the operating condition, e.g., fragmented, granular, or powdered aluminum. In addition, heterocyclic compounds such as thiophene, as well as alkyl-substituted halides, have also been used. According to this invention, it has been found that undesirable side reactions including hydrocarbon cracking can be inhibited during the isomerization of saturated hydrocarbons by carrying out the hydroisomerization employing refractory acidic mixed oxides-hydrogenation agent catalysts in the presence of carboxylic acids having a molecular weight within the range of about 150–400.

To illustrate the instant invention, a catalyst consisting of 10% by weight nickel molybdate incorporated in a silica-alumina support having a silica/alumina ratio of 75/25 was employed in the hydroisomerization of a feed stock consisting essentially of n-heptane.

This catalyst was prepared as follows. A solution of 32 grams of ammonium heptamolybdate and 20 cc. of concentrated ammonium hydroxide in 270 ml. of distilled water was heated to 176° F. To this solution, with stirring, was added 58.7 grams of nickel nitrate in 270 ml. of water. To this was added 360 grams of a commercial cracking catalyst consisting of 75% wt. silica and 25% wt. alumina. The mixture was stirred an additional 15 minutes, after which it was filtered in a Buchner funnel. The filter cake was washed with five successive 670-ml. portions of distilled water, after which it was dried for 16 hours at 230° F. and pelleted to a bulk density of about 795 grams per liter.

A 132.7 gm. portion of the pelleted "green" catalyst was placed in a laboratory catalyst testing unit and was "activated" by a conventional oxidation-reduction cyclic technique. Then it was used in extensive studies of various operating variables and regeneration-reactivation techniques.

Following one experimental reaction period, the catalyst was regenerated as follows:

(1) The catalyst bed was depressurized and purged with nitrogen for 15 minutes.

(2) Air was passed through the bed at about 650° F. for 10 minutes.
(3) The bed was heated to 975° F. while continuing air flow.
(4) It was purged with nitrogen for 15 minutes.
(5) Air was passed through, downflow, at 975° F. for 25 minutes.
(6) Air direction was switched and flow continued for 30 minutes.
(7) The bed was purged with nitrogen for 25 minutes.
(8) Hydrogen was passed through for 30 minutes.
(9) Nitrogen was passed through for 15 minutes.
(10) Hydrogen was passed through for 30 minutes.
(11) Nitrogen was passed through for 15 minutes.
(12) Air was passed through for 30 minutes.
(13) Nitrogen was passed through for 15 minutes.
(14) Hydrogen was passed through for 30 minutes.
(15) Nitrogen was passed through for 15 minutes.
(16) Air was passed through for 30 minutes.
(17) Nitrogen was passed through for 15 minutes.
(18) Hydrogen was passed through for 30 minutes.
(19) Nitrogen was passed through for 15 minutes.
(20) Air was passed through for 48 hours.
(21) The bed was cooled to 825° F. while continuing air flow.
(22) Nitrogen was passed through for 15 minutes.
(23) Hydrogen was passed through for 2 hours.
(24) The bed was cooled to 630° F. while continuing hydrogen flow.

Following this treatment, a reaction period charging technical grade normal heptane was attempted, but exothermic heat effects prevented operation. The catalyst was subjected to another purge-oxidation-purge-reduction cycle and a successful run at 620° and 500 p.s.i.g. was initiated.

The catalyst then was purposely made non-selective for isomerization by an oxidation-reduction cycle known to yield exothermic side reactions. Following this treatment, uncontrollable temperature rises occurred upon repeated attempts to initiate feed entry at bed temperatures of 610-620° F. During a brief period of operation, before heat effects became excessive, the results shown in column 1 of Table 1 were obtained.

Table I

|  | Col. 1 | Col. 2 |
|---|---|---|
|  | Before Acids | After Acids |
| Temp., ° F | 620 | 640 |
| Recovery, Wt. percent | 98.3 | 92.1 |
| $C_1$-$C_4$ yield, wt. percent | 8.07 | 5.50 |
| Conversion, wt. percent | 61.6 | 64.6 |
| $iC_5$-$iC_7$ yield, wt. percent | 54.4 | 60.0 |
| Selectivity, percent | 88.2 | 92.9 |
| $iC_7$ yield, wt. percent | 22.6 | 38.3 |
| Selectivity, percent | 36.6 | 59.2 |
| Total isomer yield, wt. percent | 30.0 | 44.8 |
| Selectivity, percent | 48.7 | 69.4 |

The method of this invention was then employed to make operation possible, even at a higher initial bed temperature, and with improved selectivity and yield.

Naphthenic acids having a molecular weight range of 320-330 were added to the normal heptane feedstock in a 1% weight concentration, and were charged to the catalyst bed for one hour. Following this treatment, it was found that the initial bed temperature could be raised to 640° F. without experiencing high-temperature effects, and a test period was conducted at the following conditions:

Catalyst temperature, ° F. _____ 640
Pressure, p.s.i.g. _____ 500
Hydrogen/hydrocarbon mol ratio _____ 3.8
Liquid volume hourly space velocity _____ 1.0

During this test period, the results shown in column 2 of Table 1 were obtained. From these data, it can be seen that approximately the same conversion was obtained at 640° F. after treatment, as was obtained at 620° F. before treatment, i.e., overall activity was less. However, it was striking that the yield of material boiling below pentanes was reduced 31.8%, while the yield of liquid isomers was increased 49.3% with an improvement of 42.5% in selectivity for isomerization.

In another comparative run, a feed stock consisting of 45 volume percent n-pentane, 45 volume percent of n-hexane, and 10 volume percent cyclohexane plus 1 volume percent benzene was isomerized in the presence of a 10% nickel molybdate on 75/25 silica-alumina prepared as above.

The results shown in column 1 of Table II summarize the data obtained in the processing of this feed stock in the absence of added amounts of naphthenic acids. In column 2 is shown the enhancement in selectivity, viz., an increase from 77.4% to 95.9%, when the isomerization process was carried out employing a feed stock to which had been added 1.2 weight percent (based on the amount of feed) of naphthenic acids having a molecular weight of 220-230.

Table I

|  | Column 1 | Column 2 |
|---|---|---|
| Reactor temperature, ° F | 700 | 710 |
| Pressure, p.s.i.g | 350 | 350 |
| Liquid Volume Hourly Space Velocity | 1 | 1 |
| $H_2$/hydrocarbon mole ratio | 1 | 1 |
| R.O.N. of product | 69.4 | 70.0 |
| $nC_5$+$nC_6$ conversion, percent | 48.4 | 50.8 |
| $isoC_5$+$isoC_6$ yield, percent | 37.5 | 48.7 |
| Selectivity, percent | 77.4 | 95.9 |
| iso $C_5$ yield, percent | 31.8 | 32.8 |
| iso $C_6$ yield, percent | 42.9 | 63.0 |
| $iC_5$ and heavier yield, percent (liquid only) | 89.4 | 97.4 |

The foregoing example demonstrates the efficiency of the instant invention in improving the selectivity of refractor mixed oxides-hydrogenation agent composite isomerization catalysts which have innate hydrocracking tendencies.

A number of catalyst preconditioning processes have been developed which are designed to reduce this innate hydrocracking tendency in catalysts prior to their use in isomerization processes. These techniques usually are based on preconditioning the activated catalysts by specific techniques in which controlled oxidation-reduction cycles are employed. These treatments can be carried out before or after the catalyst is placed in the reactor. I have found that isomerization catalysts prepared by incorporating small amounts of a hydrogenation promoter on a refractory, mixed oxides base can be preconditioned by oxidizing the constituents of the catalysts to the greatest extent possible under the conditions of oxidation employed, and thereafter reducing the reducible constituents of the catalysts by contact with hydrocarbon feed stock and hydrogen under isomerization operating conditions without first having reduced the reducible constituents of the catalyst prior to putting the unit on stream. In a specific embodiment of this technique the following procedural steps are employed:

(1) Oxidize the catalyst with air at 950° to 1050° F. for five to ten hours.
(2) Cool with air to processing temperature, generally about 650-750° F.
(3) Purge with an inert gas such as nitrogen.
(4) Pressurize as rapidly as possible with hydrogen to processing pressure which generally is about 150-1000 p.s.i.g.
(5) Immediately thereafter introduce hydrocarbon feed at a normal isomerization space velocity (0.5-5.0), together with hydrogen at a norman isomerization hydrogen-to-hydrocarbon ratio (1/1 to 5/1).

When the optimum selectively-activity relationship has been attained, the efficiency of the catalyst can be maintained by introducing into the reaction zone a carboxylic acid having a molecular weight within the range of about 150–400 to provide a suitable concentration therein.

Carboxylic acids which can be used include but are not limited to hexahydrotoluic acid, hexahydrobenzoic acid, 2,2,4-trimethylcyclopentyl acetic acid, methylcyclopentyl butyric acids, cyclopentyl carboxylic acid, cyclopentyl acetic acid, methylcyclopentyl acetic acids, methylcyclopentylpropionic acids, etc. Naphthenic acids containing from six to about sixteen carbon atoms, or mixtures of these, are preferred. Examples of naphthenic acids are those extracted from crudes, or from fractions of crudes such as gasolines, naphthas, kerosenes, gas oils, and lube oils.

The commercial acids currently available possess an average molecular weight ranging between 200 and 275, and the predominating type formulas are $C_nH_{2n-2}O_2$ and $C_nH_{2n-4}O_2$, indicating one to two rings per molecule. In contrast, the higher acids possess molecular weights of from 250 to 450, with average type formulas ranging from $C_nH_{2n-4}O_2$ to approximately $C_nH_{2n-10}O_2$.

Two and three rings per molecule predominate, although more rings are suspected to be present in some molecules. Multiple-ringed molecules are believed to have condensed ring systems in the main. The physical properties of narrow-boiling cuts of naphthenic acids covering a wide range of molecular weights have been reported by Harkness and Bruun, Ind. Eng. Chem., 32,499 (1940), and by Goheen, Ind. Eng. Chem., 32,503 (1940).

The optimum quantities of carboxylic acids which are incorporated in the feed stock or introduced into the reaction zone are best determined experimentally. In general, 0.1 to 5 percent, by weight, based on total feed stock can be employed, although in some instances as little as 0.01 percent may be effective. On the other hand, quantities as high as 10 percent may be required in exceptional instances. The carboxylic acid can be introduced into the reaction zone either in admixture with the feed stocks or concomitant therewith by separately injecting the carboxylic acid into the reaction zone by means of conventional injection equipment.

Although this invention was illustrated by a specific embodiment in which a particular silica-alumina-nickel molybdate catalyst composition was employed, it is to be understood that a number of catalyst compositions are receptive to the techniques carried out in accordance with this invention. Catalysts which can be controlled in accordance with this invention are composites comprising a refractory, mixed oxides base, composited to evince acidic properties and hydrocarbon cracking activity, having incorporated therein a small amount, viz., 0.2 to 20 percent by weight, of a hydrogenation agent. Specific examples of the refractory mixed oxides base include, but are not limited to, silica-alumina, silica-zirconia, silica-titania, silica-boria, alumina-zirconia, alumina-beryllia, alumina-boria, silica-chromia, boria-titania, silica-alumina-zirconia, silica-alumina-beryllia, and acid-treated clays. The hydrogenation agent which is employed can be a group VIII metal; an oxide of a polyvalent metal of groups V, VI, and VII; or Group VIII metal salts of the oxyacids of polyvalent metals of Groups V, VI, and VII. Because of the hydrocracking tendencies of the composite isomerization catalysts promoted with base metal-containing hydrogenation agents, the instant invention is especially adaptable for use in conjunction with this type of catalyst. Specific examples of suitable hydrogenation agents include, but are not limited to, cobalt and nickel; tungsten oxide, molybdenum oxide, chromium oxide, manganese oxide and vanadium oxide; and cobalt and nickel salts of the oxyacids of tungsten, molybdenum, chromium, vanadium, or manganese, e.g., nickel tungstate, cobalt molybdate, nickel molybdate, etc. It has been found that catalyst carriers containing 50–90% silica and 50–10% alumina, having incorporated therein 0.2 to 10% of the hydrogenation agent, have superior activities and are preferred. Specific composite isomerization catalysts which can be employed include the following:

5% Ni on 87/13 silica-alumina base
1.5% Ni on 87/13 silica-alumina base
5% Ni on 75/25 silica-alumina base
5% Ni on 90/10 silica zirconia base
10% $NiMoO_4$(2.7 Ni, 4.4% Mo) on 75/25 silica-alumina
15% $NiMoO_4$(4.4, 6.7% Mo) on 50/50 silica-alumina
10% nickel tungstate on 75/25 silica-alumina
10% nickel chromate on 75/25 silica-alumina
5% nickel +1.0 Co on 75/25 silica-alumina The acidic, mixed oxides-hydrogenation agent composite isomerization catalyst to be modified in accordance with this invention can be prepared by conventional methods. Impregnation is a common method for the incorporation of the active component on the support. This procedure generally involves contacting the support with a solution of a salt, or other compound containing the desired component, which upon heating will decompose to give the desired component. The excess solution is removed and the slurry is dried and calcined to produce a "green" catalyst which is subsequently activated. Precipitation techniques can also be employed where the catalyst includes more than one component. In multi-component catalysts many variations of this method are employed. These include gel formation, cold precipitation, and combinations of precipitation with other methods. In carrying out this procedure, an aqueous salt solution containing the required component is used to impregnate a solid support. The slurry is then contacted with a suitable precipitating agent to provide an admixture of the desired promoter incorporated in the base material. As in the impregnation technique, the resulting slurry is dried to produce a "green" catalyst which is subsequently activated. Another technique, which is not as widely used as the foregoing precipitation or impregnation method, is the so-called wet-and-dry mixing method which is usually employed to prepare preformed catalysts such as pellets or extrudates. In activating these catalysts, a variety of activation techniques are utilized in order to reduce the reducible components of the catalyst composition to their lowest state of valency under the conditions employed. The desired reduction can be carried out by a simple contacting of the "green" catalyst with a reducing compound or fluid at an elevated temperature. Other techniques involve a two-step oxidation-reduction activation technique.

After the catalyst has been preconditioned, either in situ in the reactor ready for use, or in a separate preconditioning zone after which the catalyst is transferred to a reactor, the feed stock is introduced into the catalyst zone and isomerized employing operating conditions within the following ranges:

|  | Range | Preferred Range |
|---|---|---|
| Temperature, °F | 600–750 | 650–700 |
| Pressure, p.s.i.g. | 50–1,000 | 300–500 |
| $H_2$/hydrocarbon mol ratio | 1–5/1 | 2–4/1 |
| Liquid hourly volume space volume (LVHSV) | 0.1–3.0 | 0.5–1.2 |

Feed stocks which are processed in the isomerization process of this invention consists of saturated hydrocarbons having 4–8 carbon atoms per molecule. The feed stock can consist of either pure hydrocarbons or admixtures of hydrocarbons boiling within this range, such as natural gasolines or low-boiling distillates, having boiling ranges of about 90°–275° F., fractionated from a full boiling range gasoline.

Although the foregoing remarks are directed primarily to the use of a freshly prepared catalyst it is to be understood that the start-up procedure employed for improving the efficiency of an isomerization process can also be used in starting up an isomerization process subsequent to the regeneration of a spent acidic oxide-base-hydrogenation agent composite employing a conventional oxidation-reduction cycle-regeneration process, in which the catalyst is subsequently activated by reducing the catalyst to its lowest state of valency at the conditions of reduction employed.

It is apparent from the foregoing discussion that variations or modifications can be made by those skilled in the art without departing from the spirit of this invention. Various manipulative isomerization techniques can be employed wherein the isomerization catalyst is preconditioned. It is, therefore, intended that the instant invention be limited only as specifically set forth in the appended claims.

What is claimed as my invention is:

1. In a hydroisomerization process wherein a feed stock consisting predominantly of an isomerizable, saturated hydrocarbon is contacted with a refractory, acidic, oxides-base-hydrogenation agent solid composite at an elevated temperature not in excess of about 750° F. and at an elevated pressure within the range of about 100–1000 p.s.i., the method of increasing the efficiency of the hydroisomerization process by mitigating exothermic side reactions, including hydrocracking, which comprises carrying out the isomerization process in a reaction zone in the presence of added amounts of a naphthenic acid having a molecular weight within the range of about 150 and 400, in amounts sufficient to substantially suppress hydrocracking of the hydrocarbon constituents of said feed stock.

2. In a hydroisomerization process wherein a feed stock consisting predominantly of a $C_4$–$C_8$ saturated hydrocarbon is contacted with a refractory, acidic, oxides-base-hydrogenation agent solid composite at a temperature within the range of about 600 to 750° F., a pressure within the range of about 100–1000 p.s.i., and a $H_2$/hydrocarbon mol ratio within the range of about 1–5:1, the method of increasing the efficiency of the hydroisomerization process by mitigating exothermic side reactions, including hydrocracking, which comprises carrying out the hydroisomerization process in a reaction zone in the presence of added amounts of a naphthenic acid having a molecular weight within the range of about 150–400 in amounts sufficient to substantially suppress hydrocracking of the hydrocarbon constituents of the feed stock.

3. In a hydroisomerization process wherein a feed stock consisting predominantly of a $C_4$–$C_8$ saturated hydrocarbon is contacted with a refractory, acidic, oxides-base-hydrogenation agent solid composite at a temperature within the range of about 600 to 750° F., a pressure within the range of about 100–1000 p.s.i., and a $H_2$/hydrocarbon mol ratio within the range of about 1–5:1, the method of increasing the efficiency of the hydroisomerization process by mitigating exothermic side reactions, including hydrocracking which comprises carrying out the hydroisomerization process in a reaction zone in the presence of added amounts of a naphthenic acid having a molecular weight within the range of about 150–400 in amounts within the range of about 0.1–5% by weight, based on said feed stock.

4. In a process in accordance with claim 3 in which said naphthenic acid is introduced into said reaction zone concomitantly with said feed stock.

5. In a process in a accordance with claim 4 in which said naphthenic acid is mixed with said feed stock prior to introducing the feed stock into the reaction zone.

6. In a hydroisomerization process wherein a feed stock consisting predominantly of a $C_4$–$C_8$ saturated hydrocarbon is contacted with a refractory, acidic, oxides-base, nickel-containing, hydrogenation agent solid composite at a temperature within the range of about 600 to 750° F., a pressure within the range of about 100–1000 p.s.i., and a $H_2$/hydrocarbon mol ratio within the range of about 1–5:1, the method of increasing the efficiency of the hydroisomerization process by mitigating exothermic side reactions, including hydrocracking, which comprises carrying out the hydroisomerization process in a reaction zone in the presence of added amounts of a naphthenic acid having a molecular weight within the range of about 150–400 in amounts sufficient to substantially suppress hydrocracking of the hydrocarbon constituents of the feed stock.

7. In a hydroisomerization process wherein a feed stock consisting predominantly of a $C_4$–$C_8$ saturated hydrocarbon is contacted with a refractory, acidic, oxides-base, nickel-containing, hydrogenation agent solid composite at a temperature within the range of about 600 to 750° F., a pressure within the range of about 100–1000 p.s.i., and a $H_2$/hydrocarbon mol ratio within the range of about 1–5:1, the method of increasing the efficiency of the hydroisomerization process by mitigating exothermic side reactions, including hydrocracking, which comprises carrying out the hydroisomerization process in a reaction zone in the presence of added amounts of a naphthenic acid having a molecular weight within the range of about 150–400 in amounts within the range of about 0.1–5% by weight, based on said feed stock.

8. Process in accordance with claim 7 in which the catalyst consists essentially of a silica-alumina support promoted with small amounts of a reduced nickel molybate.

References Cited in the file of this patent

UNITED STATES PATENTS

| | | |
|---|---|---|
| 2,550,531 | Ciapetta | Apr. 24, 1951 |
| 2,642,383 | Berger et al. | June 16, 1953 |
| 2,682,495 | Kirshenbaum | June 29, 1954 |
| 2,718,535 | McKinley et al. | Sept. 20, 1955 |
| 2,762,854 | McKinley et al. | Sept. 11, 1956 |